United States Patent [19]

Phan et al.

[11] Patent Number: 5,197,628
[45] Date of Patent: Mar. 30, 1993

[54] RESERVOIR FOR STORING A PRESSURIZED FLUID AND A METHOD OF MANUFACTURING SAME

[75] Inventors: Albert Phan, Saint-Medard-En-Jalles; Jean-Louis Tisne, Martignas; Serge Guihou, Bordeaux, all of France

[73] Assignee: Aerospatiale Societe Nationale Industrielle, Paris, France

[21] Appl. No.: 706,660

[22] Filed: May 29, 1991

[30] Foreign Application Priority Data

Jun. 12, 1990 [FR] France .............................. 90 07268

[51] Int. Cl.⁵ .............................................. B65D 1/16
[52] U.S. Cl. .................................... 220/589; 220/590
[58] Field of Search ............... 220/589, 590, 592, 586, 220/587, 584

[56] References Cited

U.S. PATENT DOCUMENTS

| | | | |
|---|---|---|---|
| 2,685,979 | 8/1954 | Zeek et al. | 220/589 |
| 2,799,435 | 7/1957 | Abplanalp . | |
| 3,098,578 | 7/1963 | Rudelick . | |
| 3,124,001 | 3/1964 | Conley . | |
| 4,504,530 | 3/1985 | Bliley | 220/590 |
| 4,690,295 | 9/1987 | Wills | 220/590 |
| 4,925,044 | 5/1990 | Hembert | 220/589 |
| 5,025,943 | 6/1991 | Forsman | 220/589 |

FOREIGN PATENT DOCUMENTS

| | | |
|---|---|---|
| 1372120 | 4/1964 | France . |
| 2002497 | 10/1969 | France . |
| 2164548 | 8/1973 | France . |

Primary Examiner—Joseph Man-Fu Moy
Attorney, Agent, or Firm—Marshall, O'Toole, Gerstein, Murray & Bicknell

[57] ABSTRACT

A reservoir for storing a pressurized fluid is disclosed, having a longitudinal axis and comprising a central tubular portion closed at its ends by two bottoms, one at least of which bulges outwardly and is provided with a neck, and also a method of manufacturing such a reservoir.

According to the invention, said reservoir is formed by a tubular shell of a composite fiber-thermoplastic binder material and two end pieces made from a thermoplastic material strengthened with reinforcement fibers, said shell and said end pieces being secured solidly together by local heat-melted zones.

6 Claims, 5 Drawing Sheets

RESERVOIR FOR STORING A PRESSURIZED FLUID AND A METHOD OF MANUFACTURING SAME

BACKGROUND OF THE INVENTION

1. Field of the Invention

The present invention relates to a reservoir for storing a pressurized fluid as well as the method for manufacturing same.

2. Description of the Prior Art

The American patent U.S. Pat. No. 3,508,677 or the French patent FR-A-2 630 810 teaches a reservoir storing a pressurized fluid comprising, on the one hand, an inner shell having a form of revolution about a longitudinal axis with a cylindrical portion and two end pieces, at least one of these end pieces bulging outwardly and comprising a neck and, on the other hand, a wrapping of fibers (glass, carbon, Kevlar (registered trademark) boron, etc...) coated with a hardenable binder completely surrounding said shell, while leaving said neck free.

In such a known reservoir, said inner shell serves as wrapping mandrel for said fiber wrapping and, in order to carry out said wrapping easily by winding, said binder is chosen of a heat hardenable type. Thus, in a method for manufacturing such reservoirs, it is necessary to have as many mandrels as reservoirs to be produced and to subject each reservoir to prolonged treatments at high temperatures so as to obtain appropriate hardening (polymerization) of said heat-hardenable binder.

These known reservoirs are therefore costly. On the other hand, they have high performances and can withstand high inner pressures, of several hundred bars.

However, when it is desired to obtain lower performance reservoirs, withstanding for example internal pressures of only a few tens of bars, it is not economically advantageous to provide the structure of the known reservoirs described above for such lesser performance reservoirs.

Furthermore, for example from the international patent application WO-A-84 00351 and from the French patent FR-A-2 579 130, methods are known for forming hollow bodies by wrapping fibers coated with thermoplastic binder. In these known methods, the fibers coated with thermoplastic binder (so not very flexible at ambient temperature) are wrapped on a mandrel while undergoing at the same time the action of a tracking heating device, causing partial melting thereof in the vicinity of the mandrel so as to facilitate wrapping thereof on said mandrel by softening them and/or binding the consecutive turns of the wrapping solidly together by welding. It is obvious that the heat generated by this tracking heating device must be precise, so that partial melting of the fibers coated with the thermoplastic binder is sufficient to make wrapping thereof and/or welding of said turns possible, without however being excessive so as not to damage said fibers. The regulation of this heat supply is relatively simple to obtain when the speed of application of the fibers is constant, for example during production of a tubular hollow body, but becomes impossible when this speed of application varies, which would be the case in forming bottoms of a reservoir by wrapping.

Therefore, use of this known technique is only possible for producing tubes. In addition, the use of this known technique requires hollow mandrels which remain imprisoned in the tubes after wrapping of the fibers coated with a thermoplastic binder or solid mandrels which have to be destroyed after such wrapping. In both cases, as many mandrels are required as tubes to be formed.

SUMMARY OF THE INVENTION

The object of the present invention is to make possible the construction of reservoirs (and not simple tubes) from a composite fiber-thermoplastic binder material, without using expendable mandrels.

For this, in accordance with the present invention, the reservoir for storing a pressurized fluid having a longitudinal axis and comprising a central tubular portion closed at its ends by two bottoms, one at least of which bulges outwardly and is provided with a neck, is remarkable in that it is formed by a tubular shell of a composite fiber-thermoplastic binder material and two end pieces made from a thermoplastic material strengthened with reinforcement fibers, said shell and said end pieces being secured solidly together by local heat-melted zones.

Thus, the reservoir according to the present invention may be produced by securing solidly together, by heat welding, three parts made from a composite fiber-thermoplastic binder material, namely the tubular shell (forming said central tubular portion) and the two end pieces (forming said bottoms). The result is that said end pieces may be made in any known way, for example by injection, which overcomes the above drawback linked to the tracking heating device. Because these three parts are made from a composite fiber-thermoplastic binder material, assembly thereof by heat-fusion is particularly resistant and tight, so that, although formed of three parts, the reservoir of the present invention behaves as if it were in one piece.

Advantageously, each local heat-melted zone providing solid fixing between said shell and one of said end pieces is tubular and coaxial with said longitudinal axis.

The neck may be formed in said end piece forming said bulging bottom. In a variant, said neck may be formed by an annular part solidly fixed to said end piece forming said bulging bottom. Preferably, for fixing a device for closing said neck on said reservoir, inserts are partially embedded in said end piece forming said bulging bottom.

So that heat sealing of the three pieces forming the reservoir according to the present invention is optimum, the thermoplastic binder of the composite material forming said tubular shell and the thermoplastic material of said two end pieces are of the same kind. For example, said thermoplastic binder and said thermoplastic material are made from polyamide.

In order to form a reservoir for storing pressurized fluid from a composite material formed of fibers coated with a binder, said reservoir having a longitudinal axis and comprising a central tubular portion closed at its ends by two bottoms, one at least of which bulges outwardly and is provided with a neck, it is advantageous, according to the present invention, to carry out the following operations:

on a mandrel, whose outer surface corresponds to the inner surface of said central tubular portion, a shell is formed by wrapping a strip of a composite material formed of fibers coated with a thermoplastic material binder, said strip being brought to partial melting point by heating at the moment of its wrapping;

said shell is removed from said mandrel and is cut to a length corresponding to that of the central tubular portion;

then two pieces are formed from a thermoplastic material strengthened with reinforcement fibers to the shape of said end pieces;

said thermoplastic material pieces are assembled on the ends of said shell; and they are secured firmly together by local heat fusion of said fiber reinforced thermoplastic material pieces and said shell made from a composite fiber-thermoplastic binder material.

In order to facilitate separation of said shell and the mandrel (and so make it possible to use the latter again for producing other reservoirs), prior to wrapping of said strip of composite fiber-thermoplastic binder material on said mandrel, it is preferable to wrap a strip of flexible thermoplastic material, without fibers, on said mandrel so as to cover the whole of the surface of the mandrel on which said strip of composite fiber-thermoplastic binder material is subsequently wrapped. Thus, the wrapping formed by the second strip, made fast with said shell by heat welding during construction thereof by wrapping, forms a sliding interface between the mandrel and said shell, thus forming a sealing film inside the reservoir.

Advantageously, each of said thermoplastic material parts (obtained preferably by injection) comprises a collar for fitting it with a tight fit on the corresponding end of said composite fiber-thermoplastic binder material shell. The local heat-melting, for fixing each thermoplastic material part firmly to the corresponding end of said shell of composite fiber-thermoplastic binder material then takes place between said collar of said part and the facing surface of said shell.

Such local heat-melting is preferably obtained by means of an electric resistance surrounding said collar and disposed between it and the facing surface of said shell, when said collar is fitted on the corresponding end of said shell. Such an electric resistance may be in the form of a flexible grid or cloth. It is wound on said collar before the part is fitted in the corresponding end of said shell, after which they are fitted together with application of a heat treatment.

With such heat treatment, which causes the contraction and/or expansion of the parts to be fitted together, it is possible to force fit said parts together so that each of said electric resistances is pressed radially between the corresponding end piece and the shell. The result is that the heat sealing may then be optimum.

BRIEF DESCRIPTION OF THE DRAWINGS

The figures of the accompanying drawings will better show how the invention may be put into practice. In these figures, identical references designate similar elements.

DESCRIPTION OF THE PREFERRED EMBODIMENTS

Figure 1:
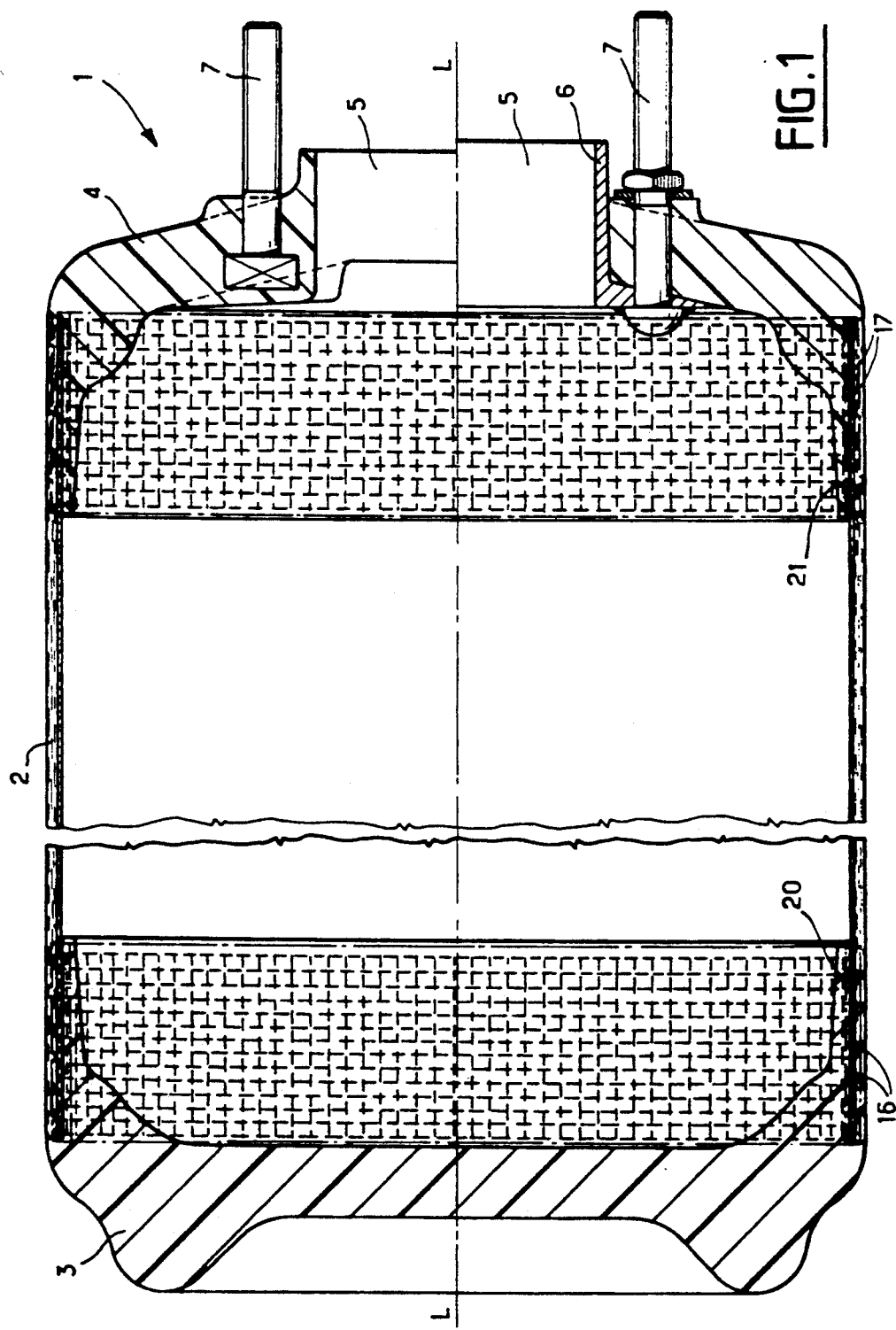
FIG. 1 shows in longitudinal section two embodiments of the reservoir according to the present invention.

The reservoir 1, according to the present invention and illustrated in figures and 2, is for example intended to form the body of a water or powder extinguisher withstanding a service pressure equal to about 20 bars.

Reservoir 1 has essentially a cylindrical shape about a longitudinal axis L—L and it comprises a cylindrical central tubular portion 2 closed at its ends by two bottoms, respectively 3 and 4. The front bottom 4 bulges outwardly and is provided with a neck 5.

Figure 2:
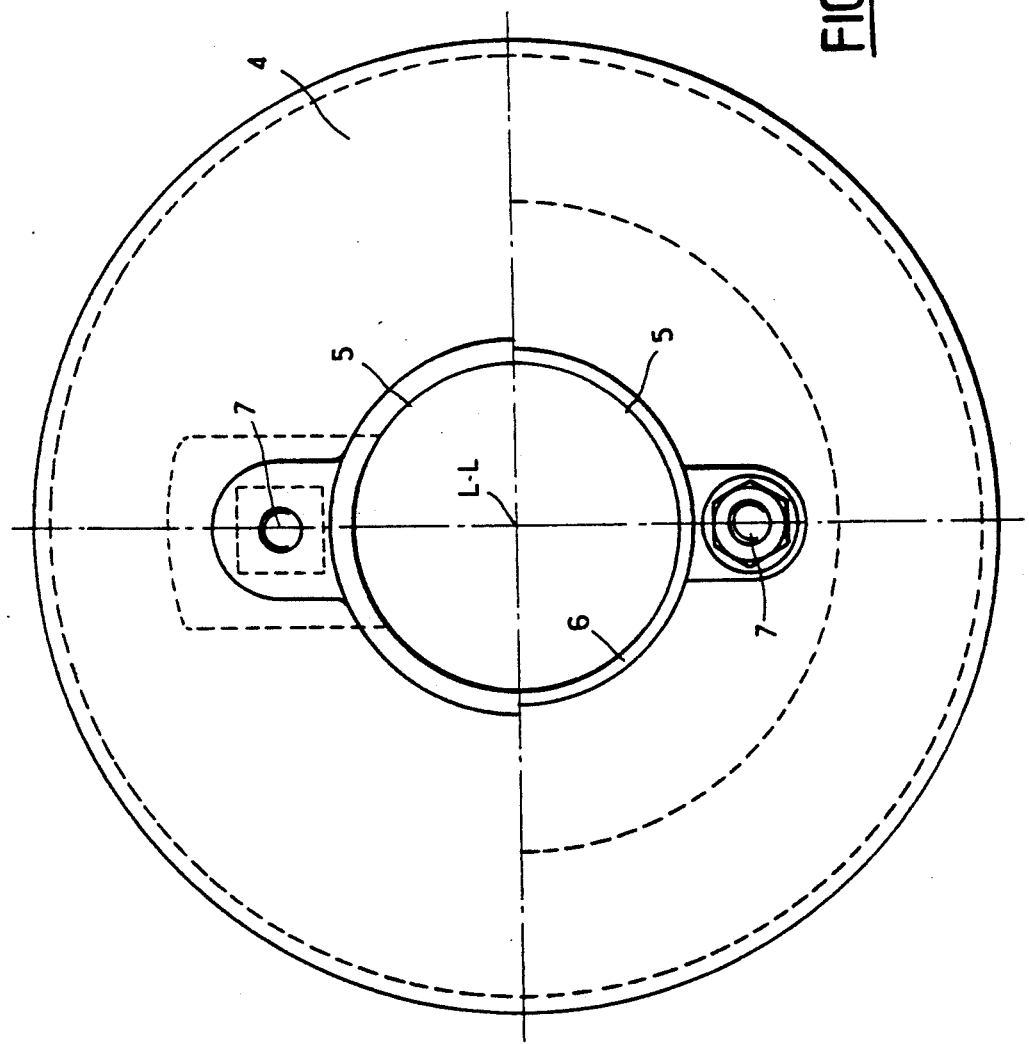
FIG. 2 is an end view of the reservoir of figure 1, on the neck side.

In the upper half view of FIGS. 1 and 2, an embodiment has been shown in which neck 5 forms an integral part with the front bottom 4 and is formed in the material thereof. On the other hand, the lower half view of FIGS. 1 and 2 illustrates an embodiment in which neck 5 is formed by an tubular piece 6, fixed sealingly to said front bottom 4.

Metal inserts 7 are fixed to said front bottom 4 for fixing a device (not shown) for controllably closing neck 5.

Figure 3:
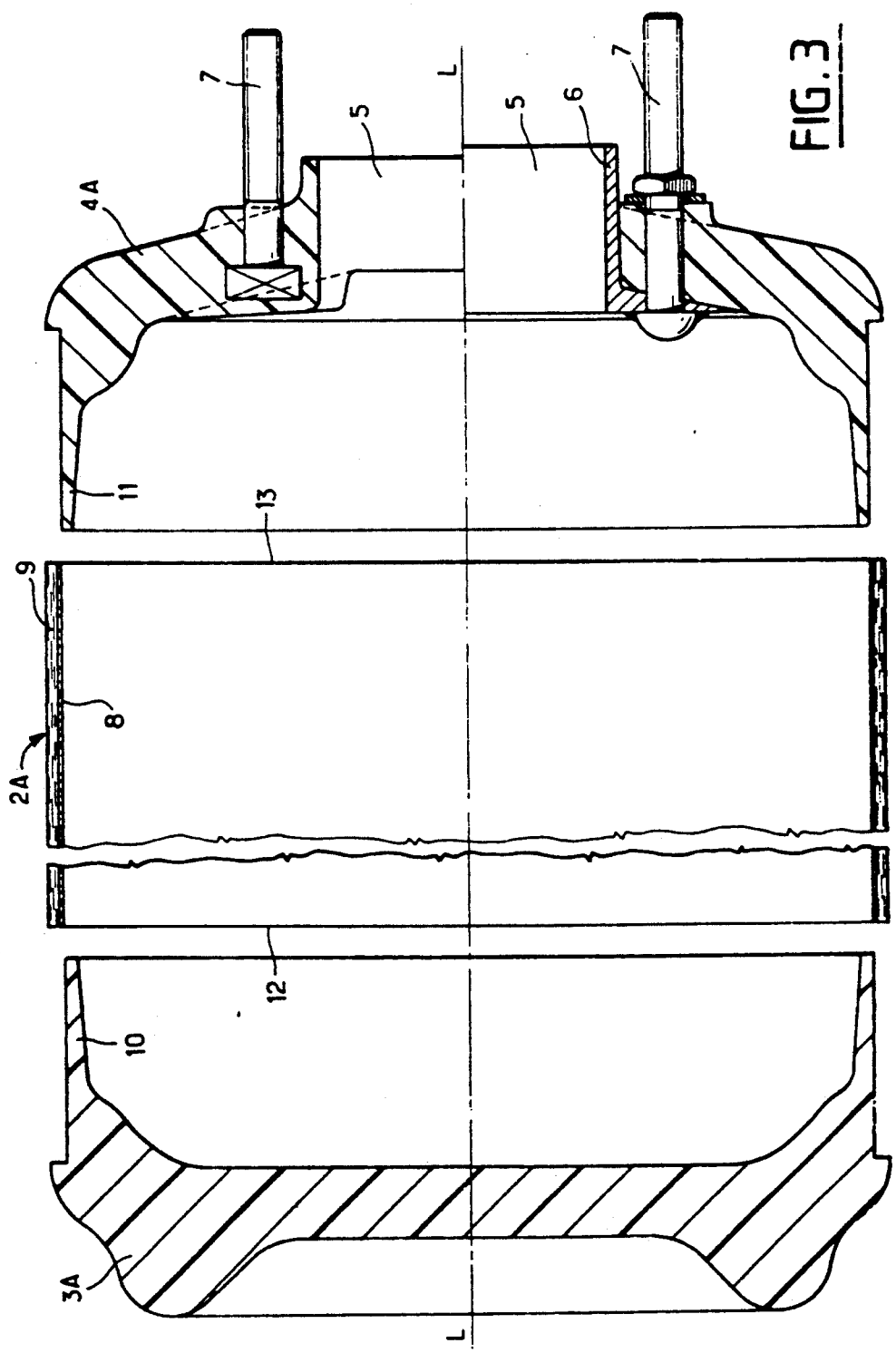
FIGS. 3, 4 and 5 illustrate successive phases of forming the reservoir of FIGS. 1 and 2.
Figure 4:
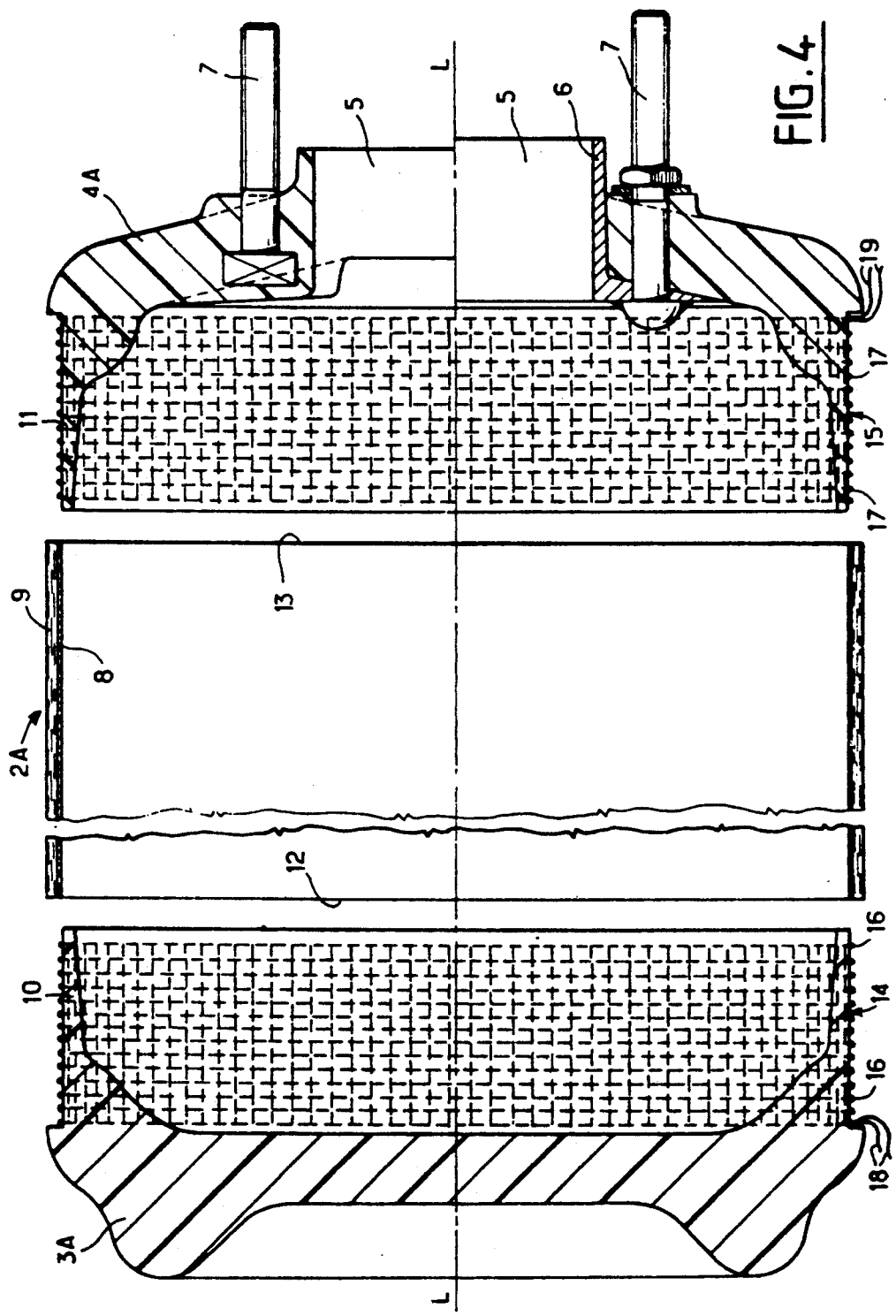
Figure 5:
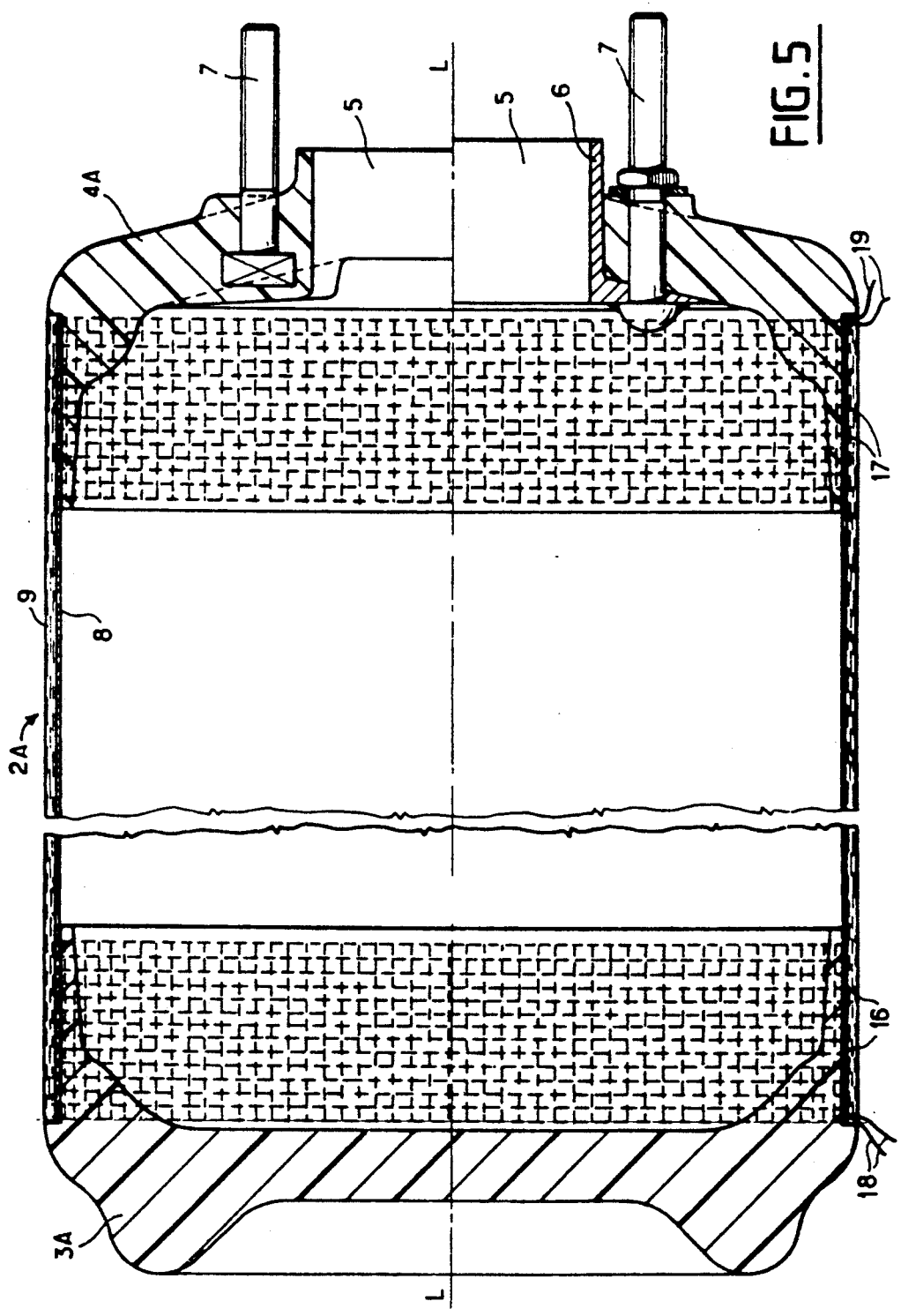

As shown in FIGS. 3 to 5, reservoir 1 is formed by assembling and securing firmly together a cylindrical tubular shell 2A (intended to form the central tubular portion 2) and two end pieces 3A and 4A (intended respectively to form the rear bottom 3 and the front bottom 4).

To obtain the cylindrical tubular shell 2A, a first flexible strip of thermoplastic material, for example polyamide, is first of all wrapped on a cylindrical mandrel, for example made from aluminium, so as to form an under layer 8 covering the surface of said mandrel without gaps. For this, said first flexible strip is for example wrapped helically with jointing turns in at least one thickness. Such a wrapping operation is well known in the technique, so that it has not been shown in the drawings, which do not show said mandrel either. Then, on the under layer 8 held in position on the mandrel, a second strip of thermoplastic material (for example also made from polyamide) is wrapped, this second strip incorporating fibers, for example glass fibers, so as to obtain a surface layer 9. The wrapping of the second strip is achieved while at the same time causing its thermoplastic material to melt, as is described for example in the French patent FR-A-2 579 130. Melting of the thermoplastic material of the second strip ensures heat welding of said second strip on itself, as well as heat welding of the turns of the first strip with each other. The surface layer 9 is advantageously formed of several wrapped thicknesses of said second strip.

After forming layers 8 and 9 thus firmly secured together, the assembly of these layers 8 and 9 is separated from the wrapping mandrel and cut to length so as to form the cylindrical tubular shell 2A. It will be noted that, because of the presence of the under layer 8, separation from the mandrel is easy by longitudinal translation, the under layer 8 allowing layers 8, 9 to slide over said mandrel. The latter may then be used again for forming other cylindrical tubular shells, similar to shell 2A.

Parts 3A and 4A are preferably obtained by injection molding of a thermoplastic material (for example a polyamide). Such injection molding is well known in the technique and has not therefore been shown in the figures. In order to obtain the desired mechanical pressure strength, reinforcement fibers (for example made from glass) are introduced into the injection mold before injection of the thermoplastic material. Such reinforcement fibers may be short or long depending on the desired applications. They may be distributed random fashion or on the contrary in an organized way. In the latter case, it is then advantageous to dispose woven pieces in the injection mold. Inserts 7, possibly with the annular part 6, are also disposed in the injection mold before injection of the thermoplastic material, so as to be at least partially embedded in this thermoplastic material and secured firmly to said parts 3A and 4A.

As can be seen in the figures, each of parts 3A and 4A comprises a collar, respectively 10 and 11, for fitting it on an end 12 or 13 of shell 2A. In the figures, the case has been shown where the collars 10 and 11 penetrate into ends 12 and 13, but this arrangement although advantageous is not exclusive : in fact, the collars 10 and 11 may also be formed so that it is the ends 12 and 13 of shell 2A which penetrate therein. It would then be sufficient to dispose the heat melting resistances described hereafter, not on said collars 10 and 11 but on said ends 12 and 13 of shell 2A.

As shown in FIG. 4, on the outer cylindrical surfaces 14 and 15 of collars 10 and 11, electric resistances, respectively 16 and 17, are disposed. Such electric resistances could be obtained by helically winding an electrically resistant wire. However, it is advantageous for the electric resistances 16, 17 to have the structure of a metal cloth (or grid), as shown, said cloths being applied over the whole of the cylindrical surfaces 14, 15 of said collars 10 and 11. The electric resistances 16 and 17 may be connected to an external power source (not shown), respectively by connecting conductors 18 and 19.

After the resistances 16 and 17 have been positioned on the outer cylindrical surfaces 14 and 15 of collars 10 and 11, the diameter of said surfaces 14 and 15, increased by the thickness of said resistances 16 and 17, is substantially equal to the internal diameter of shell 2A. Thus, to facilitate introduction of said collars, covered by their respective resistance, inside the ends 12 and 13 of shell 2A, heat treatment is applied to shell 2A and/or to parts 3A and 4A. For example, shell 2A is heated to 100° C. (so it expands) whereas parts 3A and 4A are cooled to −18° C. (so they contract). It is then possible to fit the collars 10 and 11 (provided with resistances 16 and 17) in the ends 12 and 13 of shell 2A (see FIG. 5), the connecting conductors 18 and 19 remaining accessible from outside.

Fitted thus together, resistances 16 and 17 are pressed between said collars 10 and 11 and the internal wall of shell 2A.

Then resistances 16, 17 are supplied with power by connecting them to said power source via the connecting conductors 18, 19. Resistances 16, 17 heat up and melt the surface thermoplastic material facing collars 10, 11 and shell 2A. After such heating, the collars 3A and 4A are therefore solidly fixed to shell 2A by heat welding, by means of the local cylindrical heat-melted (then resolidified) zones 20 and 21, surrounding resistances 16, 17 (see FIG. 1).

If they have not been destroyed by passage of the current, the connecting conductors 18, 19 are then levelled. It will be noted that resistances 16, 17 remain imprisoned in reservoir 1, then forming a reinforcement for bottoms 3, 4.

Thus, with the invention, light reservoirs can be obtained (whose weight may be 50% less than that of metal reservoirs of the same volume and having the same pressure strength). It will be noted that, with &:he same bottoms 3, 4, but with different shell lengths 2A, it is possible to obtain reservoirs of different volumes, with identical tools.

Although the example described relates more particularly to an extinguisher body, it goes without saying that the present invention may be used for manufacturing reservoirs for numerous other uses, such for example as domestic gas cylinders.

What is claimed is

1. Reservoir for storing a pressurized fluid having a longitudinal axis and comprising a central tubular portion closed at its ends by two bottoms, one at least of which bulges outwardly and is provided with a neck, which reservoir is formed by a tubular shell of a composite fiber-thermoplastic binder material and two end pieces made from a thermoplastic material strengthened with reinforcement fibers, said shell and said end pieces being secured solidly together by local heat-melted zones, each local heat-melted zone providing fixing between said shell and one of said end pieces being tubular and coaxial to said longitudinal axis.

2. The reservoir as claimed in claim 1, wherein said neck is formed in said end piece forming said bulging bottom.

3. The reservoir as claimed in claim 1, wherein said neck is formed by a tubular part solidly fixed to said end piece forming said bulging bottom.

4. The reservoir as claimed in claim 1, wherein inserts are partially embedded in said end piece forming said bulging bottom.

5. The reservoir as claimed in claim 1, wherein the thermoplastic binder of the composite material forming said tubular shell and the thermoplastic material of said two end pieces are of the same kind.

6. The reservoir as claimed in claim 5, wherein said thermoplastic binder and said thermoplastic material are made from polyamide.

* * * * *